United States Patent
Surnilla et al.

(10) Patent No.: US 9,255,541 B2
(45) Date of Patent: Feb. 9, 2016

(54) METHOD AND SYSTEM FOR ENGINE CONTROL

(71) Applicant: Ford Global Technologies, LLC, Dearborn, MI (US)

(72) Inventors: Gopichandra Surnilla, West Bloomfield, MI (US); Steven Schwochert, Garden City, MI (US); Peter C. Moilanen, Clinton, MI (US); Eric Krengel, Dearborn, MI (US); Todd Anthony Rumpsa, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 13/854,840

(22) Filed: Apr. 1, 2013

(65) Prior Publication Data

US 2014/0297159 A1    Oct. 2, 2014

(51) Int. Cl.
*F02D 19/06* (2006.01)
*F02B 7/00* (2006.01)
(Continued)

(52) U.S. Cl.
CPC ........ *F02D 41/3094* (2013.01); *F02D 13/0219* (2013.01); *F02D 19/061* (2013.01); *F02D 19/0694* (2013.01); *F02D 19/084* (2013.01); *F02D 19/085* (2013.01); *F02D 41/0025* (2013.01); *F02D 41/061* (2013.01); *F02D 41/402* (2013.01); *F02D 43/04* (2013.01); *F02D 13/0261* (2013.01); *F02D 41/029* (2013.01); *F02D 41/0255* (2013.01);
(Continued)

(58) Field of Classification Search
CPC . F02D 19/0694; F02D 19/08; F02D 41/3094; F02D 19/084; F02D 19/085; F02D 41/403; F02D 41/402; F02D 41/0255; F02D 41/029; F02D 41/3076; F02D 41/064
USPC ........... 123/299, 575, 576, 578, 431; 701/113
See application file for complete search history.

(56) References Cited

U.S. PATENT DOCUMENTS 7,082,926 B2   8/2006   Sadakane et al.
7,198,031 B2   4/2007   Saito et al.
(Continued)

FOREIGN PATENT DOCUMENTS

CA   2809298 A1   5/2013
EP   1859142 B1   2/2006
(Continued)

OTHER PUBLICATIONS

Surnilla, Gopichandra et al., "Method for Fuel Injection Control," U.S. Appl. No. 14/189,900, filed Feb. 25, 2014, 45 pages.
(Continued)

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods and systems are provided for controlling exhaust emissions by adjusting an injection profile for different fuels injected into an engine cylinder from different fuel injectors during engine start and crank. By splitting fuel injection during start and cranking so that fuel of lower alcohol content is port injected and fuel of higher alcohol content is direct injected as one or multiple injections, the soot load of the engine can be reduced and fuel economy can be improved.

22 Claims, 5 Drawing Sheets

(51) Int. Cl.
    *F02D 41/30* (2006.01)
    *F02D 43/04* (2006.01)
    *F02D 19/08* (2006.01)
    *F02D 41/40* (2006.01)
    *F02D 41/00* (2006.01)
    *F02D 13/02* (2006.01)
    *F02D 41/02* (2006.01)
    *F02D 41/06* (2006.01)

(52) U.S. Cl.
    CPC .......... *F02D 41/064* (2013.01); *F02D 41/3076* (2013.01); *F02D 2013/0292* (2013.01); *Y02T 10/18* (2013.01); *Y02T 10/36* (2013.01); *Y02T 10/44* (2013.01)

(56) References Cited

U.S. PATENT DOCUMENTS

| | | |
|---|---|---|
| 7,270,112 B2 | 9/2007 | Kinose |
| 7,284,506 B1 * | 10/2007 | Sun ............... F02D 19/0692 123/1 A |
| 7,287,509 B1 * | 10/2007 | Brehob ............. F02D 1/0025 123/1 A |
| 7,314,036 B2 | 1/2008 | Altenschmidt |
| 7,377,255 B2 * | 5/2008 | Miyashita ................ 123/305 |
| 7,412,821 B2 | 8/2008 | Araki et al. |
| 7,415,348 B1 | 8/2008 | Ramappan et al. |
| 7,549,408 B2 | 6/2009 | Russell |
| 7,599,787 B2 | 10/2009 | Hokuto et al. |
| 7,694,507 B2 | 4/2010 | Tokuda |
| 7,712,451 B2 | 5/2010 | Hung et al. |
| 7,769,527 B2 | 8/2010 | Noda et al. |
| 7,894,973 B2 | 2/2011 | Mallebrein et al. |
| 8,100,107 B2 * | 1/2012 | Bidner et al. ............ 123/299 |
| 2006/0096575 A1 | 5/2006 | Araki et al. |
| 2006/0102136 A1 * | 5/2006 | Bromberg ........... F02B 47/04 123/198 A |
| 2007/0068485 A1 | 3/2007 | Hilditch |
| 2007/0119413 A1 * | 5/2007 | Lewis et al. ................ 123/295 |
| 2007/0119414 A1 | 5/2007 | Leone et al. |
| 2007/0215110 A1 | 9/2007 | Stein et al. |
| 2009/0099756 A1 * | 4/2009 | Demura ............ F02D 41/064 701/103 |
| 2009/0229570 A1 | 9/2009 | Ulrey et al. |
| 2009/0282810 A1 * | 11/2009 | Leone ............. F02D 19/081 60/285 |
| 2010/0063712 A1 * | 3/2010 | Bromberg ......... F02D 19/12 701/111 |
| 2010/0294236 A1 * | 11/2010 | Surnilla ........... F02D 41/0025 123/304 |
| 2011/0162620 A1 * | 7/2011 | Bidner ............ F02D 41/0025 123/299 |
| 2011/0184629 A1 * | 7/2011 | Krengel ............ F02D 19/061 701/103 |
| 2013/0073183 A1 * | 3/2013 | Cohn ............... F02D 41/3094 701/104 |
| 2014/0172275 A1 * | 6/2014 | Surnilla ............ F02D 41/062 701/104 |
| 2015/0122218 A1 * | 5/2015 | Wakao ............. F02D 41/008 123/304 |

FOREIGN PATENT DOCUMENTS

| | | |
|---|---|---|
| EP | 1881192 A1 | 3/2006 |
| EP | 2256321 A2 | 12/2010 |
| WO | 2012028944 A1 | 3/2012 |
| WO | 2013075234 A1 | 5/2013 |

OTHER PUBLICATIONS

Surnilla, Gopichandra et al., "Method and System for Engine Control," U.S. Appl. No. 13/720,760, filed Dec. 19, 2012, 43 pages.
Surnilla, Gopichandra et al., "Method and System for Engine Control," U.S. Appl. No. 13/854,835, filed Apr. 1, 2013, 50 pages.

* cited by examiner

METHOD AND SYSTEM FOR ENGINE CONTROL

FIELD

The present application relates to methods and systems for controlling fuel injection in an engine system configured to operate on one or more fuels.

BACKGROUND AND SUMMARY

Engines may be configured with direct fuel injectors that inject fuel directly into a combustion cylinder (direct injection), and/or with port fuel injectors that inject fuel into a cylinder port (port fuel injection). Multi-fuel engine systems can use both port and direct injection with different fuel types provided to the different injectors. For example, direct injection of ethanol fuel may be used with port injection of gasoline fuel. Therein, the direct injection of the alcohol fuel may take advantage of the increased charge cooling effects of the alcohol fuel's higher heat of vaporization and increased octane. This helps to address knock limitations, especially under boosted conditions. Further, the port injection of the gasoline fuel may take advantage of the higher power output of the gasoline fuel.

Direct injected engines, however, also generate more particulate matter emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. Similarly, the injected fuel may encounter less turbulence when air is flowing past the valves. Consequently, there may be pockets of rich combustion that may generate soot locally, degrading exhaust emissions.

One approach for reducing particular matter emissions generated by direct injection of fuel is shown by Bidner et al. in US2011/0162620. Therein, an amount of fuel injected into the cylinder, between the direct injector and the port fuel injector, is adjusted based on the amount of particulate matter (PM) produced by the engine. For example, as a soot load increases, a fuel injection amount from the direct injector is decreased while a fuel injection amount from the port injector is correspondingly increased.

However, the inventors herein have identified potential issues with such an approach. In multi-fuel engine systems, where the fuel that is port injected is different (e.g., with a different alcohol content or a different fuel volatility) from the fuel that is direct injected, the shift towards more usage of the direct injected fuel may not sufficiently reduce PM emissions to meet the mandated low PM emission standards. For example, during selected engine operating conditions, the direct injection may be performed too late such that by the time the direct injection occurs, the emitted PMs are higher than emission standards. As another example, the higher soot load generated by the port injected fuel may eclipse the lower soot load generated by the direct injected fuel, obscuring the PM reduction resulting from the direct injection. The problem may be further exacerbated in multi-fuel engine systems due to the varying availability of the different fuels. For example, due to reduced availability of a first fuel (with a higher alcohol content or a higher fuel volatility) that is coupled to the direct injector, direct injection of the first fuel may be reduced and port injection of a second fuel (with a lower alcohol content or a lower fuel volatility) may be increased. As another example, increased port injection may be enabled for alternate reasons such as increased residence time of a fuel in the corresponding fuel tank. Further still, the fuel volatility may have interactions with the injector type. For example, port fuel injection can have problems with fuel volatility while direct injection is relatively insensitive to fuel volatility. As a result, fuels having higher volatility (e.g., fuels with higher T50 values) can greatly degrade cold port injected fuel combustion but have a much smaller effect on direct injected fuel combustion. As such, this can degrade combustion stability and increase potential for engine misfire. Overall, fuel economy and cold-start exhaust emissions may be degraded.

The above issues may be at least partly addressed by a method for an engine comprising: during a first combustion event since engine start, port injecting a first amount of a first fuel during a closed intake valve event; and direct injecting a second amount of a second fuel over multiple injections of the first combustion event, the first fuel having a lower alcohol content than the second fuel. In an alternate embodiment, the first fuel may have a lower fuel volatility than the second fuel. In this way, benefits from different fuel types as well as from a fuel injection split between port injection of a first fuel and (single or multiple) direct injection(s) of a second fuel can be synergized.

In one example, during an engine start, an engine control system may inject a first fuel having a lower alcohol content, or a lower fuel volatility (such as gasoline) for the first cylinder combustion event, as a first port injection delivered during a closed intake valve event (e.g., during an exhaust stroke of a previous cylinder). Further, a second fuel having a higher alcohol content, or a high fuel volatility (for example, a gasoline-ethanol blend such as E85) may be injected, on the first cylinder combustion event, as a second direct injection, the direct injected fuel delivered over multiple direct injections. For example, the direct injected second fuel may be delivered with at least one injection during an intake stroke, and at least one injection during a compression stroke. This may constitute a first injection profile. The first injection profile may be continued during cranking for a number of combustion events, based on the cylinder event number, until a threshold cylinder event number is reached. The number of combustion events over which the first injection profile is maintained may be based at least on the alcohol content or fuel volatility of the first and/or second fuel. For example, as the alcohol content of the second fuel increases, the number of combustion events may be increased (e.g., up to cylinder event number 24). Alternatively, as the fuel volatility of the second fuel increases, the number of combustion events may be increased. Further, the first ratio of port injected first fuel to direct injected second fuel may also be increased as the alcohol content of the second fuel relative to the alcohol content of the first fuel increases.

By injecting a first fuel with less alcohol content, or less volatility, as a port injection and a second fuel with more alcohol content, or more volatility, as a direct injection, an exhaust catalyst temperature can be rapidly increased to a light-off temperature, improving engine performance at engine cold-starts. By also splitting the direct injection so that some of the direct injected higher alcohol fuel is injected during the intake stroke and the remaining part of the fuel is injected during the compression stroke, the catalyst light-off temperature can be attained without raising exhaust particulate matter (PM) emissions and degrading engine combustion stability. At the same time fuel economy is improved. After a target cylinder combustion event number is reached, the injection profile may be transitioned to a second injection profile that is configured for engine idle speed control. The second injection profile may include, for example, only port injection of the first fuel, only direct injection of the second fuel (e.g., only in the intake stroke or only in the compression stroke), and/or a split ratio that is different from the split ratio of the first injection profile, with a higher percentage of second fuel direct injected. In still further embodiments, the injection profile during an engine cold start may vary based on the engine temperature at the cold start (e.g., based on whether it is a nominal temperature engine cold start or a very cold temperature engine cold start).

In this way, by using a split injection profile that splits fuel injection of different fuels between a port injection and multiple direct injections based on the properties of each available fuel, each fuel can be leveraged to reduce an activation time for an exhaust catalyst while also reducing gaseous and particulate matter emissions. At the same time, a higher amount of spark retard can be tolerated without affecting combustion stability. As such, this allows fuel injection to be optimized so as to enable the benefits of a fuel injection split between a port injection of a first fuel and direct injection of a second, different fuel to be synergized with the benefits of multiple direct injections, and be further synergized to take advantage of the different alcohol content of the different fuels. Overall, engine performance and exhaust emissions are improved, and further, fuel economy is also improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
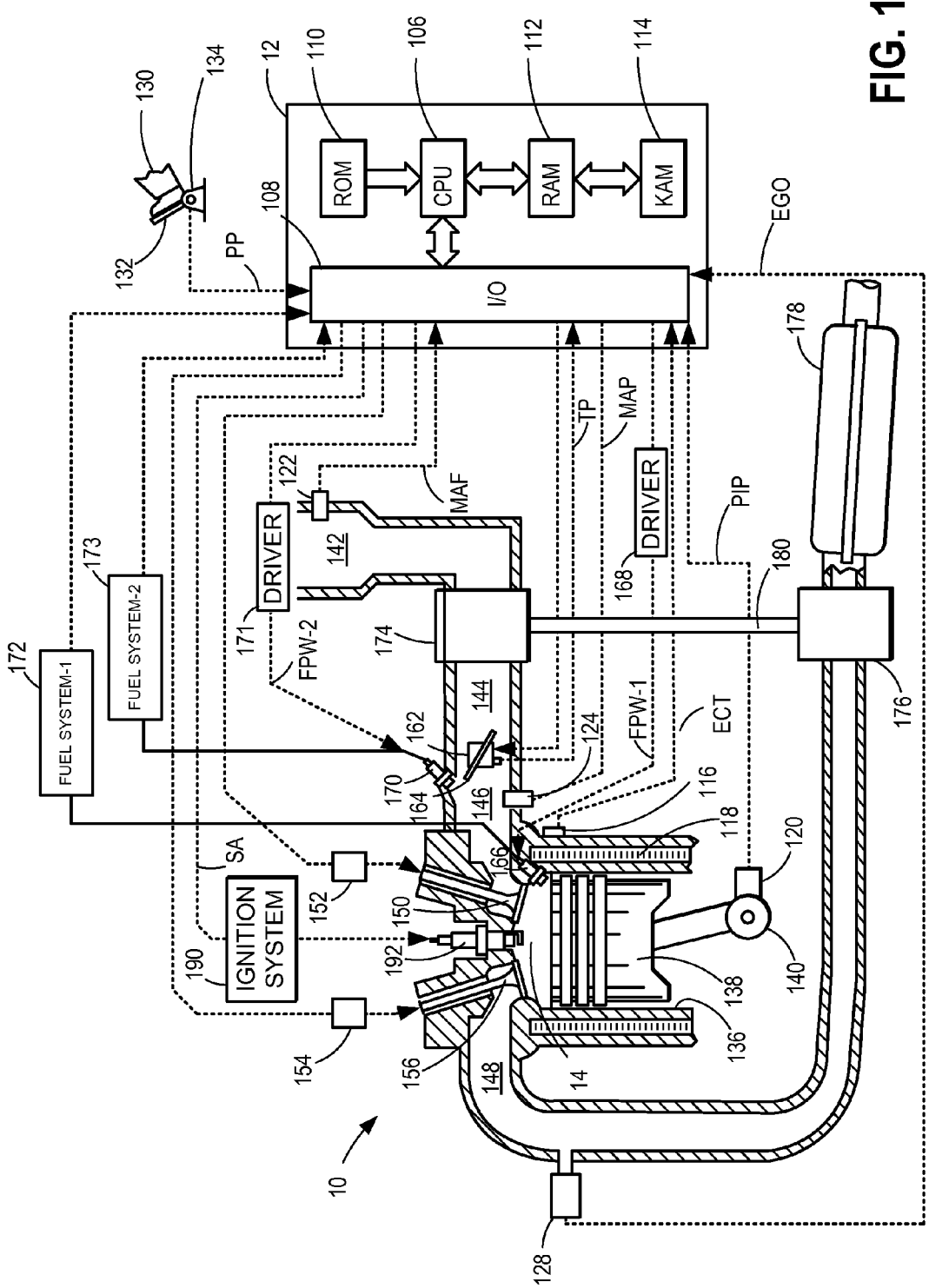
FIG. 1 shows an example combustion chamber.
Figure 3:
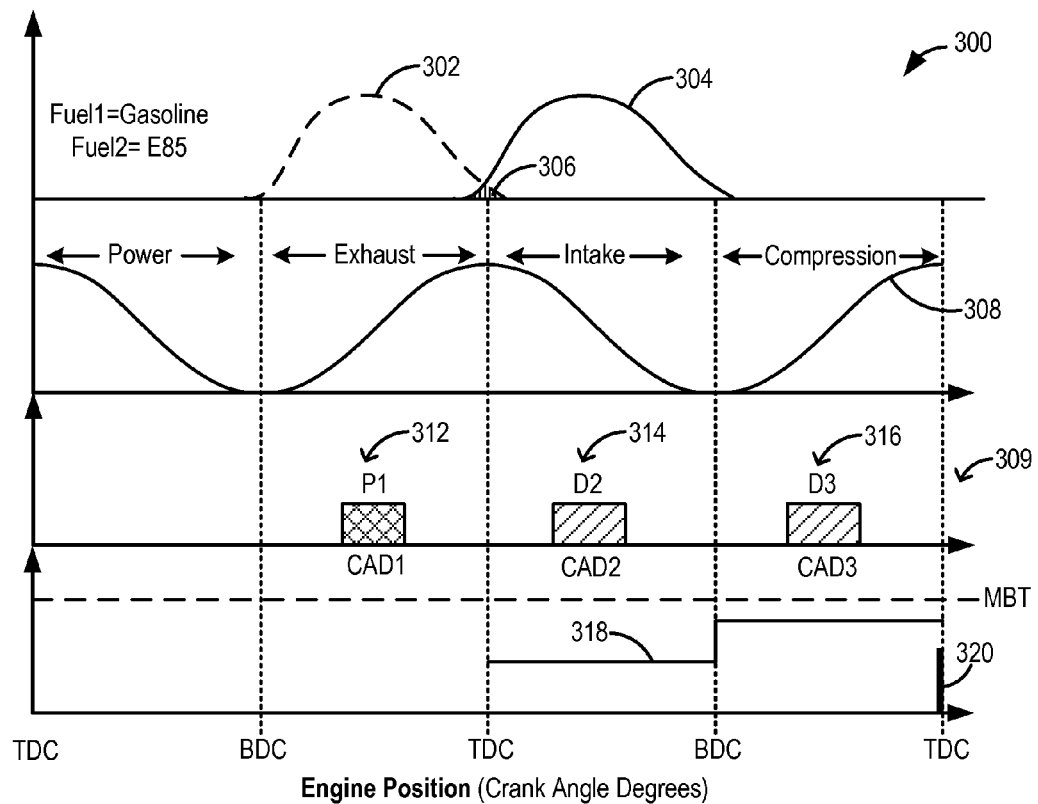
FIGS. 3-5 show example fuel injection profiles used during different engine start and crank operations when operating with fuels of different alcohol content and/or volatility, according to the present disclosure.
Figure 3:
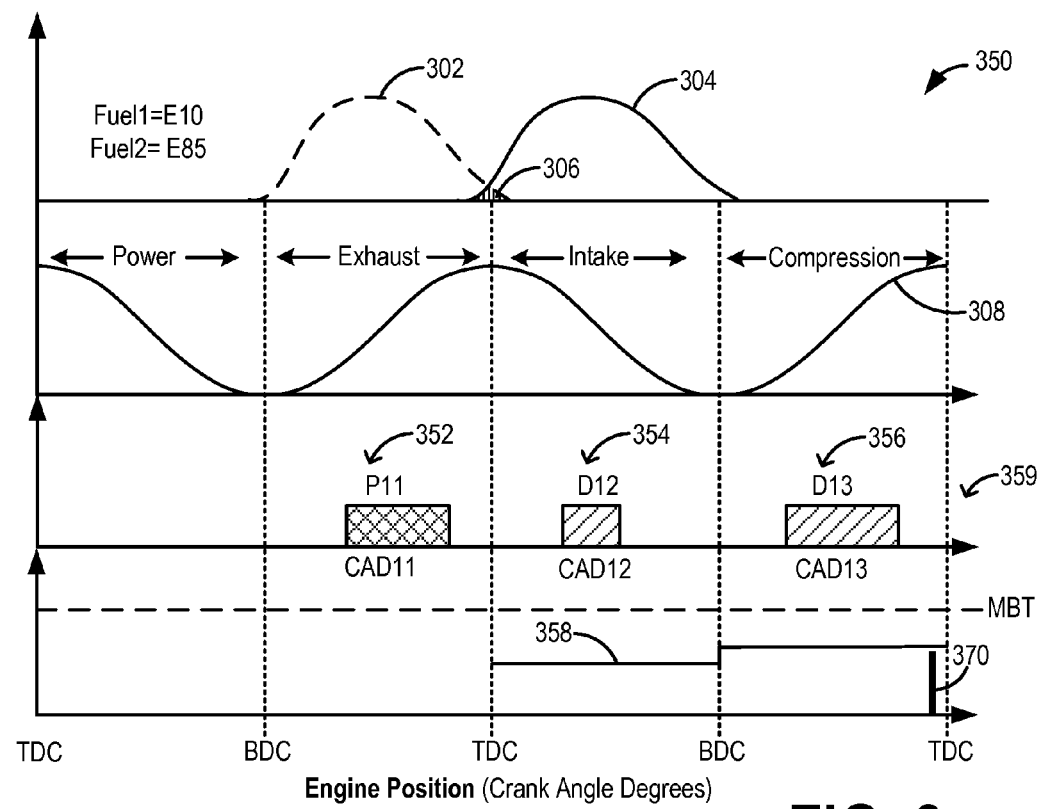
Figure 4:
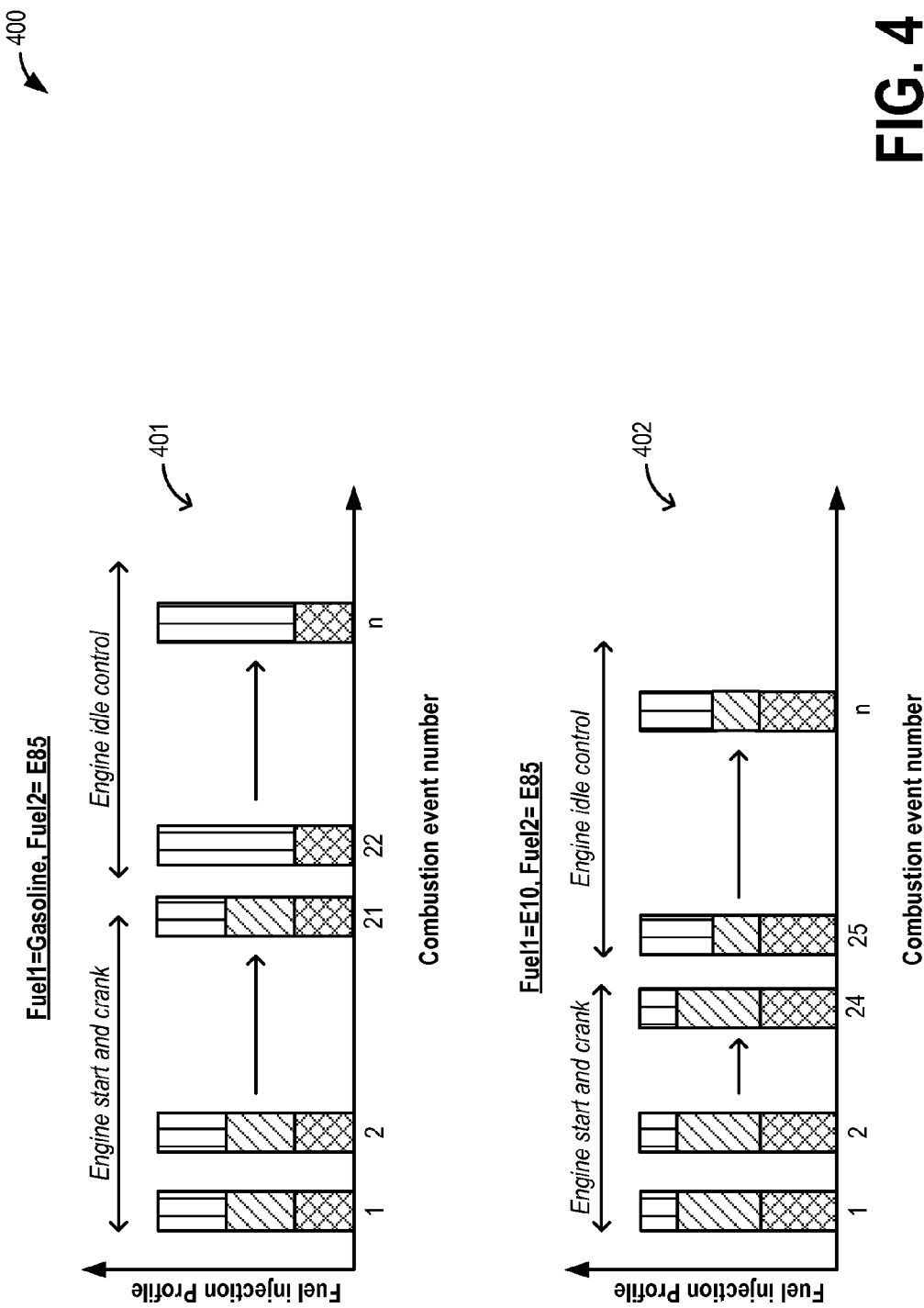
Figure 5:
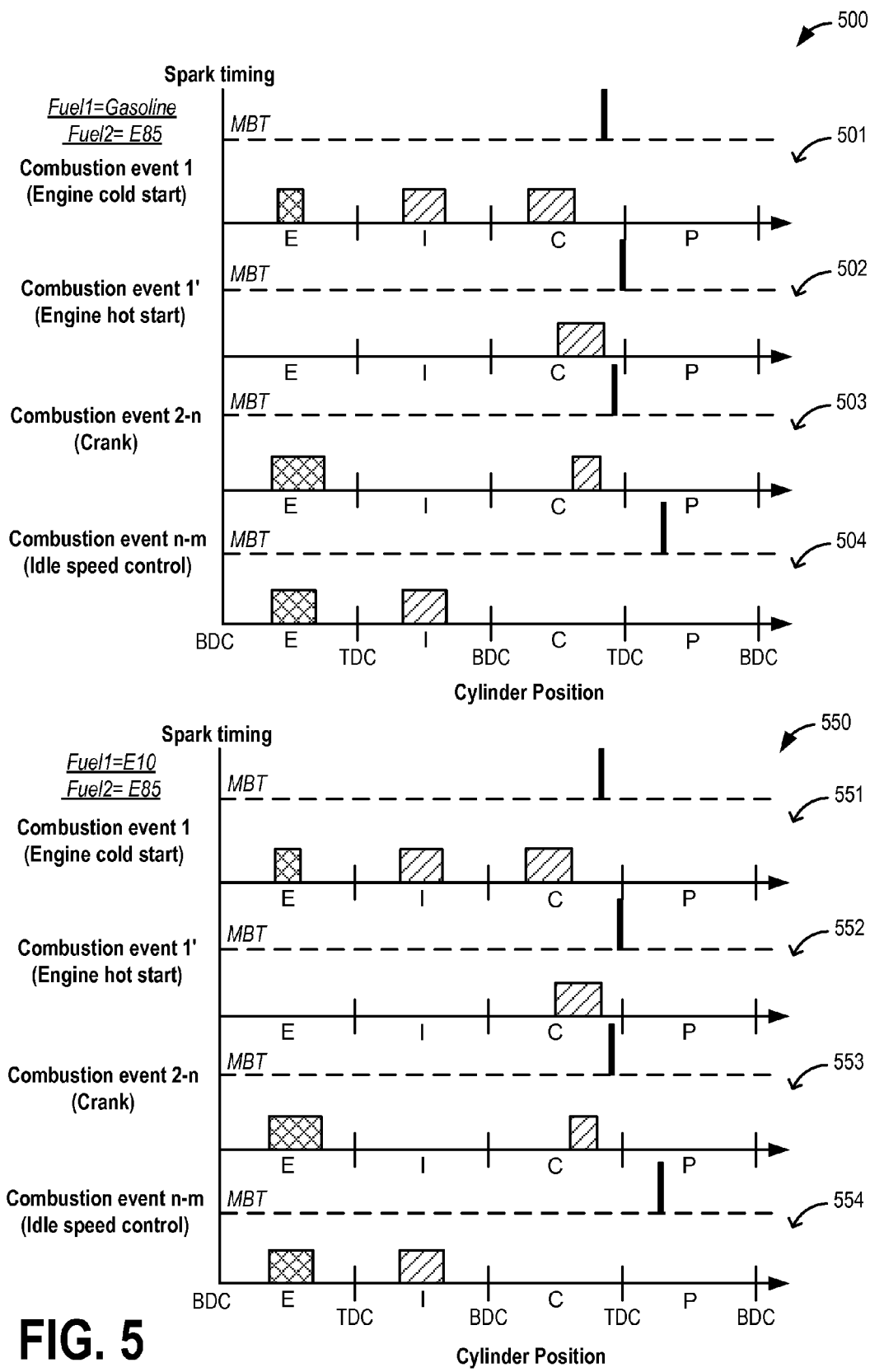

The following description relates to systems and methods for adjusting an engine fuel injection in a multi-fuel engine system, such as in the engine system of FIG. 1, during engine start and crank to reduce a soot load of the engine. An engine controller may perform a control routine, such as the routine of FIG. 2, to adjust a fuel injection profile, including an amount of a first fuel port injected to a cylinder and an amount of a second, different fuel direct injected over multiple injections into the cylinder, during an engine start and during cranking. The profile may be adjusted based on the relative alcohol content of the first and second fuels as well as each of an exhaust catalyst temperature and a cylinder event number so as to expedite catalyst activation while reducing exhaust PM emissions and without degrading combustion stability. By using a fuel injection profile having a relatively higher amount of port injection of a first lower alcohol content fuel during engine start and crank, and then transitioning to a fuel injection profile having a relatively higher amount of compression stroke direct injection of a second higher alcohol content fuel, an engine cold-start performance can be increased while lowering an engine soot load and without degrading engine fuel economy. Example adjustments are shown at FIGS. 3-5.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the low volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heats of vaporization, different fuel blends, different fuel volatilities, and/or combinations thereof etc. One example of fuels with different alcohol contents could include gasoline as a first fuel with a lower alcohol content and an ethanol fuel blend (such as E85) as a second fuel with a greater alcohol content. In another example, the engine may use ethanol fuel blends of varying alcohol content as the first and second fuel, such as E10 (which is approximately 10% ethanol and 90% gasoline) as the first fuel that is port injected and E85 (which is approximately 85% ethanol and 15% gasoline) as a second fuel that is direct injected. Other feasible substances include water, a mixture of alcohol and water, a mixture of alcohols etc. As another example, fuels with different volatility could includes fuel of different alcohol content, or fuels of different seasonal or regional grades (e.g., a winter grade fuel and a summer grade fuel, or a northern grade fuel and a southern grade fuel). Additionally, the first and second fuels may also differ in other fuel qualities such as a difference in temperature, viscosity, octane number, etc.

In the depicted embodiment, engine 10 is a multi-fuel engine system such that the fuel stored in fuel system-1 172 and delivered by fuel injector 166 is different from the fuel stored in fuel system-2 173 and delivered by fuel injector 170. As a non-limiting example, the first fuel delivered by port injection may be a first fuel having a lower alcohol content, while the second fuel delivered by direct injection may be a second fuel having a higher alcohol content. As elaborated below, the engine controller may adjust fuel injection profiles during an engine start, crank, and idle speed control to leverage the fuel properties of the different fuels available in the fuel system, as well as the benefits of port and direct injection to reduce exhaust gaseous and PM emissions.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine speed, load, exhaust temperature, PM emissions, etc. The relative distribution of the total amount of first fuel port injected by injector 170 and the total amount of second fuel direct injected (as one or more injections) by direct injector 166 may be referred to as a first injection ratio. For example, injecting a larger amount of the first fuel for a combustion event via (port) injector 170 may be an example of a higher first ratio of port to direct injection, while injecting a larger amount of the second fuel for a combustion event via (direct) injector 166 may be a lower first ratio of port to direct injection. Note that these are merely examples of different injection ratios, and various other injection ratios may be used.

Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the intake stroke, multiple injections during the compression stroke, or a combination of some direct injections during the intake stroke and some during the compression stroke. When multiple direct injections are performed, the relative distribution of the total amount of second fuel directed injected between an intake stroke (direct) injection and a compression stroke (direct) injection may be referred to as a second injection ratio. For example, direct injecting a larger amount of the second fuel for a combustion event during an intake stroke may be an example of a higher second ratio of intake stroke direct injection, while injecting a larger amount of the second fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the intake stroke, compression stroke, or any appropriate combination thereof.

As elaborated with reference to FIGS. 2-5, a controller may adjust a fuel injection profile during a first cylinder combustion event at engine start (in particular, an engine cold start), so as to leverage the fuel properties (e.g., alcohol content or fuel volatility) of the available fuels, as well as to take synergistic advantage of both a port injection and multiple direct injections in expediting exhaust catalyst activation without increasing an engine soot load and while also providing fuel economy benefits. The first injection profile used at the engine start may have a predetermined first and second injection ratio of first and second fuel usage that enables catalyst temperature control. The first injection profile may be continued into engine crank until a target cylinder event number since the first combustion is reached. Then, fuel injection may be transitioned to a second, different injection profile, having a different first and second injection ratio of first and second fuel usage that enables engine idle speed control.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 2.

Figure 2:
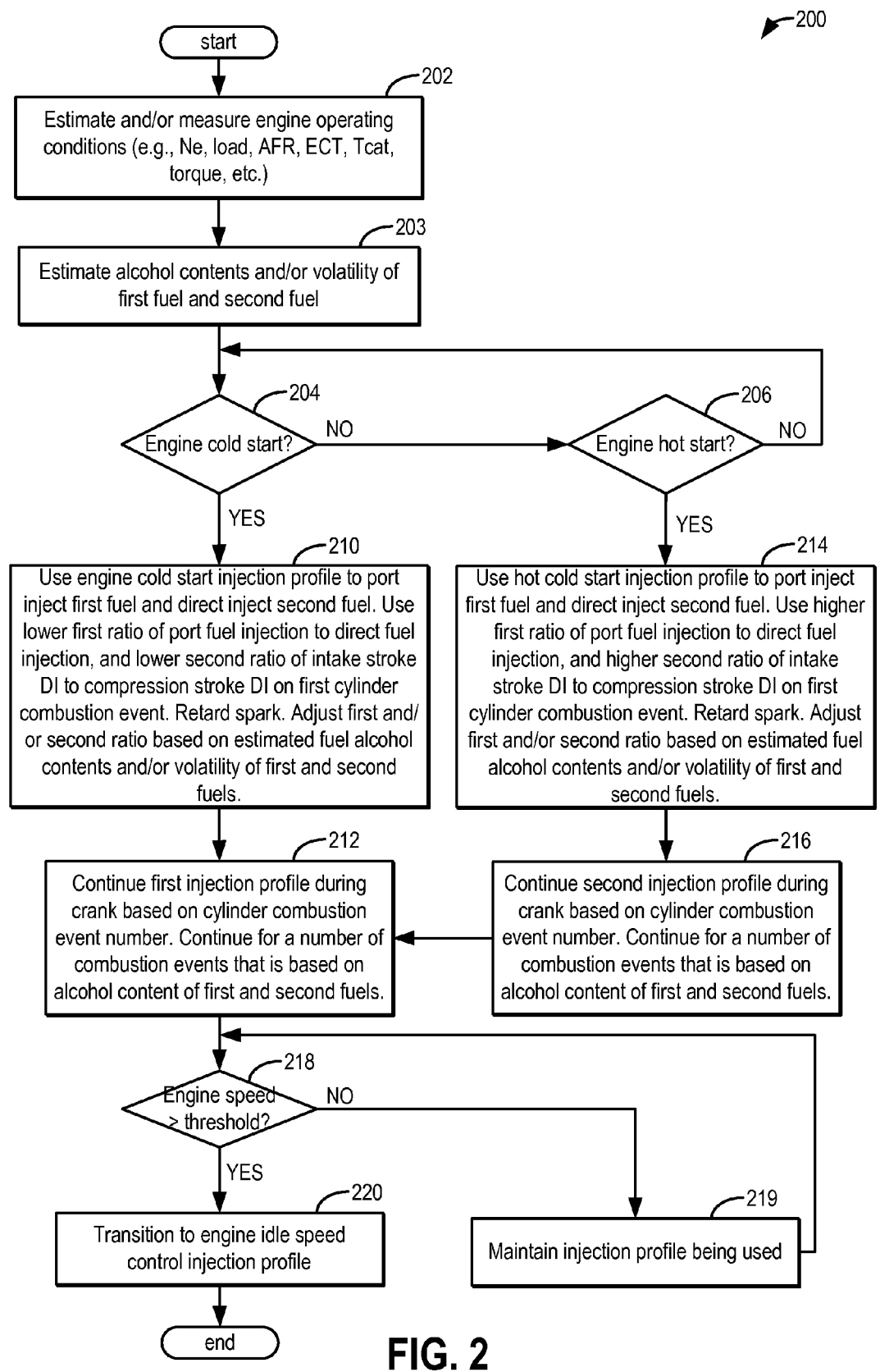
FIG. 2 shows a high level flow chart for adjusting fuel injection profiles during engine start and crank operations to reduce engine soot load.

Now turning to FIG. 2, an example routine 200 is shown for controlling fuel injection to an engine cylinder including adjusting injection of a first fuel with a lower alcohol content and/or lower fuel volatility via a first port injector and injection of a second fuel with a higher alcohol content and/or higher fuel volatility via a second direct injector to reduce an amount of particulate matter produced by the engine.

At 202, engine operating conditions may be estimated and/or measured. These may include, for example, engine speed, engine load, cylinder air-to-injected fuel ratio (AFR), engine temperature (for example, as inferred from an engine coolant temperature), exhaust temperature, catalyst temperature (Tcat), desired torque, boost, etc.

At 203, an alcohol content of each of a first fuel in the fuel system coupled to the port injector of a cylinder and a second fuel in the fuel system coupled to the direct injector of the cylinder may estimated and/or determined. Additionally, a volatility of each fuel may be estimated. In one example, the alcohol content of the fuels in the respective fuel tanks may be estimated after each tank refueling event. The estimation may be based on one or more empirical methods and sensor outputs, and further based on inputs from the vehicle operator. Likewise, the fuel volatility may be estimated based on the alcohol content of the fuel. The estimation may be also be based on the seasonal or regional grade of the fuel (as input by a vehicle operator), based on a Reid Vapor Pressure (RVP) estimate of the fuel, In the depicted embodiment, the first fuel has a lower alcohol content that the second fuel. As non-limiting examples, this may include gasoline as the first fuel and E85 as the second fuel, E10 as the first fuel and E85 as the second fuel, E10 as the first fuel and E50 as the second fuel, E15 as the first fuel and E85 as the second fuel, etc.

At 204, it may be determined whether an engine cold-start condition is present. As such, an engine cold-start may include an initial engine start from shutdown conditions. In one example, an engine cold-start condition may be confirmed if an engine temperature is below a threshold and a catalyst temperature is below a threshold (such as below a light-off temperature). If an engine cold-start condition is not confirmed, at 206, an engine hot-start condition may be confirmed. As such, the engine hot-start may include an engine restart wherein the engine is restarted soon after a preceding engine shut-down. In one example, an engine hot-start condition may be confirmed if an engine temperature and/or a catalyst temperature is above the threshold.

In response to an engine cold-start condition, at 210, the routine includes operating the engine with a first injection profile to expedite catalyst activation. Operating with the first injection profile includes, during a first combustion event since engine start, port injecting a first amount of the first fuel during a closed intake valve event, and direct injecting a second amount of the second fuel over multiple injection. Injecting the second amount of the second fuel over multiple injections may include direct injecting the second amount of the second fuel as at least an intake stroke injection and a compression stroke injection. For example, as elaborated with reference to FIG. 3, the direct injected portion of the fuel may be delivered as a first intake stroke injection and a second compression stroke injection. The injection amounts may be adjusted such that the port injection amount, the direct injected intake stroke injection amount, and the direct injected compression stroke injection amount; can vary from 0 to 100% individually but must total 100% as a group. In one example, 30% of the fuel injection may include the first fuel delivered as a port injection during a closed intake valve event (e.g., during an exhaust stroke), another 35% of the fuel injection may include the second fuel delivered as an intake stroke direct injection, while a remaining 35% of the fuel injection may include the second fuel delivered as a compression stroke direct injection. In yet another example, the port injection amount of the first fuel, the intake stroke direct injection amount of the second fuel, and the compression stroke injection amount of the second fuel may be 80%, 0%, 20% respectively.

A first ratio of the port injection amount (of first fuel) relative to a second direct injection amount (that is, total injection amount of second fuel) may be selected based on the estimated alcohol content or fuel volatility of each of the first fuel and the second fuel. For example, as the alcohol content of the second fuel relative to the first fuel increases (or as the volatility of the second fuel relative to the first fuel increases), the first ratio may be increased with the proportion of fuel that is port injected increased and the proportion of direct injected fuel decreased. As an example, when the first fuel to be port injected is gasoline and the second fuel to be direct injected is E85, the first ratio may include 35% port injection: 65% direct injection. In comparison, when the first fuel to be port injected is E10 and the second fuel to be direct injected is E85, the first ratio may include 40% port injection: 60% direct injection.

The first ratio may be further adjusted based on one or more of an exhaust catalyst temperature, engine soot trends, and an engine temperature. For example, as the catalyst temperature increases, a higher ratio of port injection may be used. The first ratio may be further based on a cylinder combustion event number since the engine start.

A second ratio of the intake stroke injection amount relative to the compression stroke injection amount may also be adjusted based on the estimated alcohol content of the first and/or second fuel. For example, as the alcohol content of the second fuel increases (relative to the alcohol content of the first fuel), the second ratio may be decreased with the proportion of fuel that is direct injected during the intake stroke decreased and the proportion of fuel direct injected in the compression stroke increased. Further, as the compression stroke injection amount is increased, a number of injections over which fuel is injected in the compression stroke may also be increased.

As an example, when the first fuel to be port injected is gasoline and the second fuel to be direct injected is E85, the second ratio may include 55% intake stroke injection: 45% compression stroke injection with the compression stroke injection including 1 or more injections. In comparison, when the first fuel to be port injected is E10 and the second fuel to be direct injected is E85, the second ratio may include 40% intake stroke injection: 60% compression stroke injection with the compression stroke injection including 2 or more injections.

The second ratio may be further adjusted based on one or more of exhaust catalyst temperature, engine temperature, and soot tendencies of the engine. Likewise, the second ratio may be further based on the cylinder combustion event number at engine start. Herein, the relatively higher amount of compression stroke direct injection of a higher alcohol content fuel may be advantageously leveraged to heat the engine and catalyst, thereby expediting catalyst activation and improving engine and catalyst performance under engine cold-start conditions, while at the same time reducing the soot load of the direct injection.

In addition to the first fuel injection profile (which includes the above-described first and second ratios), spark timing may be retarded based on one or more of the alcohol content of at least the second fuel, the volatility of at least the second fuel, the exhaust catalyst temperature and the engine temperature at the engine start. For example, as the alcohol content or fuel volatility of the second fuel increases, to supply additional heat to the exhaust catalyst, the spark timing may be retarded further from MBT. Herein, the split injection enables a larger amount of spark retard to be tolerated without degrading combustion stability. The amount of spark retard applied may be further based on each of the first and second ratios. For example, as the first or second ratio increases, spark timing may be advanced or retarded for combustion stability. For most engines that are operating at extremely retarded spark, the second ratio is increased to a level for best combustion at least PM emission.

At 212, the routine includes continuing the port injecting and direct injecting over multiple fuel injections during cranking. In particular, the continuing is performed for a number of combustion events since the first combustion event, the number based on the alcohol content of the second fuel (relative to the first fuel). For example, as the alcohol content of the second (direct injected) fuel increases, the number of combustion events over which the first cold-start injection profile is continued may be increased. The number of combustion events may also be based on the volatility of the second fuel (relative to the first fuel). For example, as the volatility of the second (direct injected) fuel increases, the number of combustion events over which the first cold-start injection profile is continued may be increased. In some embodiments, the number of combustion events may be further adjusted based on a cylinder event number. For example, the first injection profile may be continued until a threshold event number is reached.

As such, the starting of an engine is a large transient event and having the ability to manage each event enables more robust engine performance and lower gaseous and particulate emissions. Further, since engine combustion chambers vary in capabilities, the routine's ability to manage each event enables a strategy that is flexible enough to work with different types of engines as well as different types of fuels.

During engine start, the first event is fueled when the engine speed is around 150 to 200 rpm. Each event after that is fueled at a different engine speed. For low emission engines and power-trains, it is important to have flexibility in the fueling during engine start as the optimum emission/performance injection type and timing may be different for each event. For example, extreme cold starts can be a challenge for both Port and Direct Injection systems for different reasons. Port injection systems lose a lot of fuel into the crankcase. This dilutes the oil while the engine has trouble getting enough fuel to vaporize in cylinder to start. At extreme cold temperatures, the higher fuel pressure of direct injection works well to produce enough vaporized fuel to combust, but the displacement type high pressure fuel pump systems struggle to maintain fuel pressure at the high fuel demand of the cold start at low cranking speeds. Thus, at extreme cold starts, when a difference in alcohol content between the first fuel (configured for port injection) and the second fuel (configured for direct injection) is lower, the first combustion cycle may have the port injection system supplementing more fuel so that the direct injection system can deliver appropriately sized compression injections for robust start at extreme cold temperatures. In comparison, at extreme cold starts, when a difference in alcohol content between the first fuel (configured for port injection) and the second fuel (configured for direct injection) is higher, the first combustion cycle may have the port injection system supplementing less fuel so that the direct injection system can deliver appropriately sized compression injections for robust start at extreme cold temperatures. After a cycle, the engine speed may be sufficient for the direct injection high fuel pump to maintain the desired pressure for fuel vaporization and efficient combustion. At that point, port injection of fuel can be reduced, based on torque demand, until the engine warms up.

Engine starting can also be optimized based on the volatility of the fuel. If a lower fuel volatility is detected by a slower than desired engine start profile, the amount of fuel that is port injected can be reduced and the amount of fuel that is direct injected can be increased. Furthermore, the amount of direct injected fuel in the compression injection can be increased to improve cylinder charge stratification and thus improve fuel combustibility. This start performance improvement would need to be weighed with the possible soot load increase due to the increase of the compression direct injected fuel mass.

As another example, a different fuel injection adjustment may be performed at the restart of an engine at operating temperature (or hot start). Here, for the quickest start, direct injection of a higher alcohol content fuel may be used for the first revolution. Then, port injection of a lower alcohol content fuel may be added. The result is a faster engine start with lower PM emissions. As yet another example, at extreme hot start temperatures, the fuel in the low pressure port injection fuel rail may become vapor while the direct injection high pressure keeps the fuel liquid. Thus, at extreme hot operating temperatures, when a difference in alcohol content between the first fuel (configured for port injection) and the second fuel (configured for direct injection) is lower, the first cycle may have a low first ratio such that mainly direct injection is used to start the engine. Then, the first ratio may be increased, removing vapor from the port injection system and cooling the port fuel rail as cooler fuel comes into it. In comparison, at extreme hot operating temperatures, when a difference in alcohol content between the first fuel (configured for port injection) and the second fuel (configured for direct injection) is higher, the first cycle may have a 25% first ratio such that mainly direct injection is used to start the engine. The small amount of port injection will work to purge fuel vapor from the port fuel rail by bringing in fresh fuel and cooling the port fuel rail. After a specific amount of port fuel has been injected over a period of time and the fuel vapor has been purged, the first ratio may be increased, as dictated by the specific engine operating conditions.

At 218, it may be determined if the engine speed is higher than a threshold speed. In particular, it may be determined if cranking has been completed and an engine idling speed has been attained. While the depicted example suggests determining if cranking is completed based on engine speed, in alternate examples, it may be determined that cranking is completed based on a cylinder event number since the engine start (e.g., based on it being determined that a threshold number of cylinder events have elapsed since the engine start). If cranking has been completed, then at 220, after cranking has been completed, the routine includes transitioning fuel injection to a second injection profile that enables idle speed control. This may include, for example, transitioning to one of only port injecting fuel or only direct injecting fuel. In one example, the injection profile may be transitioned to a port injection only injection profile for engine starts when the engine is above a temperature threshold (e.g., a first threshold) and below another (e.g., a second threshold higher than the first threshold). In another example, the injection profile may be transitioned to a direct injection only injection profile for engine start below a temperature threshold (e.g., the first threshold) and above another threshold (e.g., a third threshold lower than the first threshold). In an alternate example, the transitioning includes, after cranking, transitioning fuel injection to port injecting the first fuel before the intake valve opens and direct the second fuel during either an intake stroke or a compression stroke. Herein, the first ratio of port fuel injection amount to direct fuel injection amount may be adjusted to be higher after cranking relative to the ratios before/during cranking. In some embodiments, the injection ratio of fuel direct injected to fuel port injected may also vary based on fuel mass. As such, at 218, if the threshold engine speed has not been attained, then at 219, the injection profile being used at crank may be maintained.

It will be appreciated that while the routine of FIG. 2 shows a first injection profile being used for all engine cold starts, in alternate embodiments, the first injection profile may vary during engine cold starts based on the engine temperature at the time of the cold start. In particular, the first and second injection ratios of the first injection profile may vary based on the engine temperature at the time of the cold start (e.g., based on whether the cold start was a regular cold start or a very cold temperature cold start). For example, at regular engine cold-starts, the first injection profile may have a first and second injection ratio that is biased relatively equal while at very cold temperature cold starts, the first injection profile may have a first and second injection ratio that is biased relatively more towards direct injection.

Returning to 206, in response to an engine hot-start condition, at 214, the routine includes operating the engine with an alternate injection profile to improve robustness at extreme hot starts. Operating with the alternate injection profile includes, during a first combustion event since engine start, port injecting a (larger) portion of fuel during a closed intake valve event, and direct injecting a (smaller) remaining portion of the fuel over multiple injections. Slight modifications to the port injected portion versus the direct injected portion may be required to optimize combustion and emissions, if the alcohol content of the first and second fuels is changed. Injecting the remaining portion of fuel over multiple injections may include direct injecting the remaining portion as at least an intake stroke injection and/or a compression stroke injection. For example, as elaborated with reference to FIG. 3, the direct injected portion of the fuel may be delivered as a first intake stroke injection and a second compression stroke injection. The injection amounts may be adjusted such that the port injection amount, the first intake stroke injection amount, and the second compression stroke injection amount are within 15% of each other. In one example, 35% of the fuel injection may be delivered as a port injection during a closed intake valve event (e.g., during an exhaust stroke), another 35% of the fuel injection may be delivered as an intake stroke direct injection, while a remaining 30% of the fuel injection is delivered as a compression stroke direct injection. In another example, 50% of the fuel injection may be delivered as a port injection during a closed intake valve event, another 50% of the fuel injection may be delivered as an intake stroke direct injection, and with no fuel injection delivered for a compression stroke direct injection. In yet another example, 70% of the fuel injection may be delivered as a port injection during a closed intake valve event with no fuel injection delivered as an intake stroke direct injection, with the remaining 30% of the fuel injection delivered as a compression stroke direct injection. In a still further example, none of the fuel may be delivered as a port injection during a closed intake valve event, while 70% of the fuel injection is delivered as an intake stroke direct injection, and while a remaining 30% of the fuel injection is delivered as a compression stroke direct injection.

A first ratio of the port injection amount relative to a total direct injection amount may be adjusted based on the alcohol content of at least the second fuel. For example, as the alcohol content of the second fuel increases, the first ratio may be decreased. The first ratio may be further adjusted based on engine coolant, or cylinder head measured or inferred temperature during the hot start. For example, as temperatures increase, a higher ratio of port injection may be used. The first ratio may be further based on the cylinder combustion event number.

A second ratio of the first intake stroke injection amount relative to the second compression stroke injection amount may also be adjusted based on the alcohol content of the second fuel. For example, as the difference in alcohol content between the first and second fuel increases, the second ratio may be increased. The second ratio may also be adjusted based on the volatility of the second fuel. For example, as the difference in volatility between the first and second fuel increases, the second ratio may be increased. The second ratio may be further adjusted based on engine coolant, or cylinder head measured or inferred temperature and a soot load of the engine. The second ratio may be further based on the cylinder combustion event number. Herein, the relatively higher amount of direct injection may be advantageously used to rapidly start the engine, thereby improving engine performance and fuel economy under engine hot-start conditions.

In comparison, if the engine and/or catalyst temperature has increased and is within a threshold region of the threshold temperature, then at 212, the controller may start transitioning the fuel injection to the engine cylinder from the relatively higher amount of port fuel injection to a relatively higher amount of direct fuel injection. The transition may be adjusted based on a distance of the engine and/or catalyst temperature from the threshold temperature. For example, once the temperature is within a threshold region of the threshold temperature, a rate of the transition may be increased as the distance from the threshold temperature increases. This may include, gradually deactivating the port injector, while gradually activating the direct injector, as the temperature approaches the threshold temperature. Thus, by the time the engine and/or catalyst temperature is at, or beyond, the threshold temperature, the fuel injection may have been transitioned to a higher amount of direct fuel injection and a smaller amount of port fuel injection. Herein, by using a higher ratio of direct injection as an engine load (and thus, engine temperature) increases, the charge cooling and improved fuel economy benefits of a direct injected fuel may be availed.

As another example, if the engine and/or catalyst temperature is above or within a threshold region of the threshold temperature, the controller may determine an engine hot start and correspondingly start transitioning the fuel injection to the engine cylinder from the relatively higher amount of port fuel injection (of the first fuel) to a relatively higher amount of direct fuel injection (of the second fuel). The transition may be adjusted based on a distance of the engine and/or catalyst temperature from the threshold temperature. For example, once the temperature is within a threshold region of the threshold temperature, a rate of the transition may be increased as the distance from the threshold temperature increases. This may include, gradually deactivating the port injector, while gradually activating the direct injector, as the temperature approaches the threshold temperature. Thus, by the time the engine and/or catalyst temperature is at, or beyond, the threshold temperature, the fuel injection may have been transitioned to a higher amount of direct fuel injection of the second fuel and a smaller amount of port fuel injection of the first fuel. Herein, by using a higher ratio of direct injection of a higher alcohol content fuel, as an engine temperature increases, the charge cooling and improved fuel economy benefits of a direct fuel injection and an alcohol fuel are leveraged.

While the routine of FIG. 2 does not show performing any spark timing adjustments while operating the alternate injection profile (use at hot start), in alternate embodiments, in addition to the alternate injection profile, spark timing may be adjusted (e.g., retarded) based on one or more of the alcohol content of the fuel, engine speed and event number at the engine hot start. As an example, as the alcohol content of the second fuel relative to the first fuel increases, spark timing may be retarded from MBT. As another example, if engine speed increases rapidly per event, spark timing may be retarded further from MBT. The amount of spark retard applied may be further based on each of the first and second ratios. For example, as the first or second ratio increases, spark timing may be advanced with the first ratio and retarded depending on the second ratio.

In one example, spark timing adjustments may be selectively performed based on the fuel injection profile to compensate for torque transients. For example, in response to a decrease in amount of port fuel injection and increase in the amount of direct fuel injection, spark ignition timing may be retarded by an amount. In alternate embodiments, additionally or optionally, adjustments may be made to one or more of boost, EGR, VCT, etc. to compensate for torque transients.

At 216, the routine includes continuing the port injecting and direct injecting over multiple fuel injections during cranking. In particular, the continuing is performed for a number of combustion events since the first combustion event, the number based on the relative alcohol content (and/or relative volatility) of the first and second fuels. Further, the number may be based on a cylinder event number. As previously elaborated, during engine start, the first event is fueled when the engine speed is around 150 to 200 rpm, each event after that being fuel with a different engine speed. At extreme cold starts, the first combustion cycle may use port injection to supplement the fuel so that the direct injection system can deliver appropriately sized compression injections for robust start at extreme cold temperatures. After a cycle, the engine speed may be sufficient for the direct injection high fuel pump to maintain the desired pressure for fuel vaporization and efficient combustion. At that point, the port injection of fuel can be suspended until the engine warms up.

In one example, during the engine crank, the fuel injection profile may be adjusted based on the engine operating conditions as well as the alcohol content and/or fuel volatility of the fuels available in the fuel systems coupled to the port and direct injectors. In one example, as an engine speed, engine load, and/or desired torque increases during the crank, an amount of fuel injected through the direct injector may be increased while an amount of fuel injected through the port injector may be decreased, and while a ratio of the port injection to the direct injection is adjusted based on the relative alcohol content (and/or relative volatility) of the available fuels. Herein, the direct injection of a fuel with higher alcohol content may provide higher fuel efficiency and higher power output while the direct injection of the alcohol also takes advantage of the charge cooling properties of the alcohol fuel.

At 218, after cranking, the routine includes determining if the engine speed is higher than a threshold speed (such as above an engine idling speed). If so, the routine includes, at 220, transitioning fuel injection to a second injection profile that enables idle speed control, as elaborated previously. Else, at 219, the first injection profile being used at cranking may be maintained and continued until, an engine idle speed is reached. The amount of crank injection profile operation will be dependent on both the engine temperature and the alcohol content (and/or volatility) of the fuel. Increasing the alcohol content of the fuel will allow increased crank injection profile operation time.

FIG. 3 shows example maps 300 and 350 of valve timing, piston position and fuel injection profiles, for a given engine cylinder, when operating with different fuel combinations. Specifically, map 300 depicts a fuel injection profile for fuel injected during a first combustion event since engine start when operating with gasoline as a first fuel (available for port injection) and E85 as a second fuel (available for direct injection). In comparison, map 350 depicts a fuel injection profile for fuel injected during a first combustion event since engine start when operating with E10 as the first fuel (available for port injection) and E85 as the second fuel (available for direct injection). During an engine start, while the engine is being cranked, an engine controller may be configured to adjust a fuel injection profile of fuel delivered to the cylinder based on the available fuels. The different fuel injection profiles of maps 300 and 350 include an amount of first fuel delivered to the cylinder as port injection and an amount of second fuel delivered to the cylinder as direct injection. Further, the direct injected portion of fuel may be delivered as a single intake stroke injection, a single compression stroke injection, or a combination thereof.

Maps 300 and 350 each illustrate an engine position along the x-axis in crank angle degrees (CAD). Curves 308 depict piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curves 308, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 306 (or simply, positive valve overlap), represented by a hatched region at the intersection of curves 302 and 304. In one example, the positive intake to exhaust valve overlap 306 may be a default cam position of the engine present during an engine cold start.

At 309, map 300 depicts an example fuel injection profile that may used at an engine start, during engine cranking, to reduce an amount of engine start exhaust PM emissions without degrading engine combustion stability. Herein, the injection profile is used when operating with gasoline as a first fuel (available for port injection) and E85 as a second fuel (available for direct injection). Specifically, map 300 depicts an example fuel injection profile used during a first combustion event since engine start. Herein, the engine start is an engine cold start. An engine controller is configured to deliver the first fuel to the cylinder as a first port injection amount depicted at 312 (hatched block, P1), while delivering the second fuel as a second intake stroke direct injection amount depicted at 314 (diagonally striped block, D2), and a third compression stroke direct injection amount depicted at 316 (diagonally striped block, D3). The first port injection amount (P1) is port injected at a first timing CAD1. In particular, the first portion of first fuel is port injected during a closed intake valve event (that is, during the exhaust stroke). Then, a second amount of second fuel is direct injected over multiple injections including a first intake stroke injection at CAD2 and a second compression stroke injection at CAD3.

In addition to splitting the amount of fuel injected as a single port injection and multiple direct injections, a spark ignition timing may be adjusted. For example, spark timing may be advanced towards MBT during port only injection (not shown), such as when the engine is started at extreme cold temperatures. As an alternate example, spark timing may be retarded with the addition of a direct compression injection (as shown at 318). By retarding the spark timing of other cylinders while the given cylinder is port injected, this allows catalyst heating and emissions to be optimized/

As such, the adjustments to spark timing depicted at 318 represent spark timing adjustments performed in (other) cylinders that are firing during the fueling of the given cylinder (whose valve timing and fuel injection profile is depicted). The spark timing of given cylinder is shown by a solid bar at 320 and may be adjusted to be near or at the compression stroke TDC.

In the depicted example, the fuel injection profile includes a ratio of first fuel port injected:second fuel that is intake stroke direct injected:second fuel that is compression stroke direct injected is set to 30:35:35. Herein, by port injecting the first fuel having the lower alcohol content and direct injecting the second fuel having the higher alcohol content, an exhaust catalyst temperature can be rapidly increased to a light-off temperature, improving engine performance at the engine cold-start. Further, by splitting the direct injection into at least a first intake stroke injection and at least a second compression stroke injection, the catalyst light-off temperature can be attained without raising exhaust particulate matter (PM) emissions and degrading engine combustion stability. This allows an engine start emissions to be improved while also improving fuel economy.

At 359, map 350 depicts an example fuel injection profile that may used at an engine start, during engine cranking, to reduce an amount of engine start exhaust PM emissions without degrading engine combustion stability. Herein, the injection profile is used when operating with E10 as a first fuel (available for port injection) and E85 as a second fuel (available for direct injection). Specifically, map 350 depicts an example fuel injection profile used during a first combustion event since engine start. Herein, the engine start is an engine cold start. An engine controller is configured to deliver the first fuel to the cylinder as a first port injection amount depicted at 352 (hatched block, P11), while delivering the second fuel as a second intake stroke direct injection amount depicted at 354 (diagonally striped block, D12), and a third compression stroke direct injection amount depicted at 356 (diagonally striped block, D13). The first port injection amount (P11) is port injected at a first timing CAD11. In particular, the first portion of first fuel is port injected during a closed intake valve event (that is, during the exhaust stroke). Then, a second amount of second fuel is direct injected over multiple injections including a first intake stroke injection at CAD12 and a second compression stroke injection at CAD13.

Herein, due to the lower difference between the alcohol content of the first fuel and the second fuel, the amount of first fuel that is port injected is increased, the amount of second fuel that is direct injected in the intake stroke is also increased, and the amount of second fuel that is direct injected in the compression stroke is correspondingly decreased.

In addition to splitting the amount of fuel injected as a single port injection and multiple direct injections, spark ignition timing may also be adjusted. For example, spark timing may be advanced towards MBT during port only injection (not shown), such as when the engine is started at extreme cold temperatures. As an alternate example, spark may be retarded with the addition of a direct compression injection (as shown at 358), with the amount of spark retard applied being smaller as compared to when the alcohol content difference between the fuels is higher (as in the example of map 300).

As such, the adjustments to spark timing depicted at 358 represent spark timing adjustments performed in (other) cylinders that are firing during the fueling of the given cylinder (whose valve timing and fuel injection profile is depicted). The spark timing of given cylinder is shown by a solid bar at 370 and may be adjusted to be at or more advanced from compression stroke TDC. For example, when the difference in alcohol content of the first and second fuels is lower, the spark timing of the cylinder receiving the fuel may be set to be 10 degrees before TDC. By setting the spark timing to be earlier, you may be allowing more time to vaporize and mix the direct compression injected fuel and improve start performance. The may be necessary since the amount of compression injected fuel has increased.

In the depicted example, the fuel injection profile includes a ratio of first fuel port injected:second fuel that is intake stroke direct injected:second fuel that is compression stroke direct injected is set to 35:35:30 Herein, by port injecting the first fuel having the lower alcohol content and direct injecting the second fuel having the higher alcohol content, an exhaust catalyst temperature can be rapidly increased to a light-off temperature, improving engine performance at the engine cold-start. Further, by splitting the direct injection into at least a first intake stroke injection and at least a second compression stroke injection, the catalyst light-off temperature can be attained without raising exhaust particulate matter (PM) emissions and degrading engine combustion stability. This allows an engine start emissions to be improved while also improving fuel economy.

Now turning to FIG. 4, map 400 shows example transitioning of fuel injection profiles from a first fuel injection profile applied during engine start and crank, to a second fuel injection profile applied during engine idle control. A number of cylinder combustion events over which the first fuel injection profile is continued and after which the second fuel injection profile is initiated is varied based on the alcohol content of the first fuel (available for port injection) relative to the alcohol content of the second fuel (available for direct injection). In particular, a first transition is depicted at 401 for a multi-fuel engine system configured with gasoline as a first fuel to be port injected and E85 as a second fuel to be direct injected. A second transition is depicted at 402 for a multi-fuel engine system configured with E10 as a first fuel to be port injected and E85 as a second fuel to be direct injected. All injection profiles are depicted over time, with combustion event numbers progressing along the x-axis.

Turning to map 401, a first fuel injection profile used when gasoline is the first fuel and E85 is the second fuel is depicted as a bar graph with the port injection of the first fuel depicted as a cross hatched bar, intake stroke direct injection of the second fuel depicted as a diagonally striped block, and compression stroke direct injection of the second fuel depicted as a vertically striped block. In the depicted example, the fuel injection profile used on the first combustion event (event 1) at start includes a ratio of first fuel port injected:second fuel that is intake stroke direct injected:second fuel that is compression stroke direct injected that is set to 30:35:35. The first injection profile is then continued from the first combustion event (1) for a number of combustion events, the number based on the alcohol content of the second fuel relative to the alcohol content of the first fuel. Herein, in response to a larger difference between the alcohol content of the first and second fuels, the first injection profile is continued for a larger number of combustion events (herein, up to event number 21). After the threshold number (herein, 21) of cylinder combustion events is reached, the fuel injection profile is transitioned to a second fuel injection profile having a larger proportion of second fuel that is direct injected only in the compression stroke and a correspondingly smaller proportion of first fuel that is port injected. Specifically, the fuel injection profile transitioned to after the threshold number of combustion events is reached includes a ratio of first fuel port injected:second fuel that is intake stroke direct injected:second fuel that is compression stroke direct injected that is set to 35:35:30.

Turning to map 402, a first fuel injection profile used when E10 is the first fuel and E85 is the second fuel is depicted as a bar graph with the port injection of the first fuel depicted as a cross hatched bar, intake stroke direct injection of the second fuel depicted as a diagonally striped block, and compression stroke direct injection of the second fuel depicted as a vertically striped block. In the depicted example, the fuel injection profile used on the first combustion event (event 1) at start includes a ratio of first fuel port injected:second fuel that is intake stroke direct injected:second fuel that is compression stroke direct injected that is set to 30:0:70. The first injection profile is then continued from the first combustion event (1) for a number of combustion events, the number based on the alcohol content of the second fuel relative to the alcohol content of the first fuel. Herein, in response to a smaller difference between the alcohol content of the first and second fuels, the first injection profile is continued for a larger number of combustion events (herein, up to event number 24). After the threshold number (herein, 24) of cylinder combustion events is reached, the fuel injection profile is transitioned to a second fuel injection profile having a larger proportion of second fuel that is direct injected only in the compression stroke and a correspondingly smaller proportion of first fuel that is port injected. Specifically, the fuel injection profile transitioned to after the threshold number of combustion events is reached includes a ratio of first fuel port injected:second fuel that is intake stroke direct injected:second fuel that is compression stroke direct injected that is set to 30:20:50.

In this way, by varying the number of combustion events over which an engine start fuel injection profile including port injection of a first lower alcohol content fuel and split direct injection of a second higher alcohol content fuel is continued based on the relative alcohol content of the fuels, emissions, combustion stability and particulate matter can be optimized. As the alcohol content of each fuel is increased, tighter calibration control may be required to maintain engine start performance, but soot load will be less of a constraint.

Now turning to FIG. 5, maps 500 and 550 show example fuel injection profiles 501-504 and 551-554, respectively that may be used during an engine start, during cranking, and during engine idle control. As elaborated herein, the injection profiles may be adjusted based on a combustion event number since the engine start, and based on the relative alcohol content of the first and second fuels available. The injection profiles may also be based on whether the engine start is a cold engine start or a hot engine start. As such, each injection profile 500, 550 depicts a timing of injection relative to a cylinder piston position. Based on the position of the cylinder's piston at any time in the engine cycle, fuel may be injected into the cylinder during an intake stroke (I), a compression stroke (C), a power stroke (P), or an exhaust stroke (E). The injection profile further depicts whether fuel was injected via port injection (hatched blocks), single or multiple direct injections (striped blocks), or both. Further, the injection profile depicts whether any spark timing adjustments were concurrently performed (e.g., use of spark retard). Map 500 depicts example injection profiles used during and after engine start and cranking when a multi-fuel engine system is configured with gasoline as a first fuel to be port injected and E85 as a second fuel to be direct injected while map 550 depicts corresponding injection profiles used when the multi-fuel engine system is configured with E10 as a first fuel to be port injected and E85 as a second fuel to be direct injected.

Turning now to the example injection profiles of map 500, an example injection profile that may be used during an engine cold start is shown at 501. In particular, injection profile 501 depicts fuel injection to a cylinder during a first cylinder combustion event (event1). During the engine cold start, an amount of first fuel (herein gasoline) is delivered into the cylinder as a first port injection (hatched block) during a closed intake valve event (that is, during an exhaust stroke of a previous cylinder combustion event). A second amount of the second fuel (herein E85) is delivered to the cylinder as each of a first intake stroke direct injection and a second compression stroke direct injection (diagonally striped blocks). The injection amounts are adjusted such that the port injection amount, the first intake stroke injection amount, and the second compression stroke injection amount are within 15% of each other. In the depicted example, 35% of the total fuel injection to the cylinder includes the first fuel delivered as a port injection during a closed intake valve event (e.g., during an exhaust stroke), another 35% of the total fuel injection includes the second fuel delivered as an intake stroke direct injection, while a remaining 30% of the total fuel injection includes the second fuel delivered as a compression stroke direct injection.

In addition to splitting the amount of fuel injected as a single port injection and multiple direct injections, a spark ignition timing may be adjusted. For example, at 501, spark timing (solid bar) may be set to be 12 degrees before TDC during the port injection.

Injection profile 502 depicts fuel injection to a cylinder during a first cylinder combustion event (event1') at hot start. The hot start may include an engine restart from idle stop for example. Alternatively, the hot start may include an engine restart from shut down where the engine has not been shut down for sufficiently a long duration (and has therefore not cooled down to ambient temperatures). During the engine hot start, no first fuel is injected into the cylinder as a first port injection while only the second fuel is injected as a direct compression injection (striped block). The injection amounts may be adjusted such that the port injection amount, the first intake stroke injection amount, and the second compression stroke injection amount can be 0% to 100%. In comparison, 40% of the total fuel injection may be delivered as a port injection (of first fuel) during a start at normal ambient temperature, another 35% of the fuel injection may be delivered as an intake stroke direct injection, while a remaining 25% of the fuel injection is delivered as a compression stroke direct injection.

In addition to the single port injection during the engine hot start, spark ignition timing may be adjusted. For example, at 502, spark timing (solid bar) may be set at TDC compared to 12 degree before TDC for normal ambient temperatures.

Injection profile 503 depicts fuel injection to a cylinder during engine cranking, and after an engine start (hot start or cold start), specifically, for n number of cylinder combustion events since the first cylinder combustion event (events 2 through n). During the engine cranking, fuel injection is transitioned to a profile where a larger portion of first fuel is port injected into the cylinder during a hot restart while a smaller portion of the second fuel is direct injected as intake/compression stroke injection. The injection amounts may be adjusted such that the port injection amount and the direct injection amount are 0% to 100% of each other. In one example, 70% of the total fuel injection may be delivered as a port injection during the cranking while another 30% of the total fuel injection may be delivered as a compression stroke direct injection.

In addition to splitting the amount of fuel injected as a single port injection and a single direct injection, spark ignition timing may be adjusted. For example, at 503, spark timing (solid bar) may be adjusted to 8 degrees before TDC.

Injection profile 404 depicts fuel injection to a cylinder that may be used following engine start and cranking, and after an engine idle speed has been attained, specifically, for a number of cylinder combustion events since the completion of cranking (events n through m). During the engine idle control while the engine is warming up, fuel injection is transitioned to a profile where the amount of first fuel port injected into the cylinder is substantially similar to the amount of second fuel that is direct injected as an intake stroke injection. Further, no fuel is direct injected during the compression stroke. The injection amounts may be adjusted such that the port injection amount and the direct injection amount are within 0% to 100% of each other. In addition to splitting the amount of fuel injected as a single port injection and a single direct injection, spark ignition timing may be adjusted. For example, at 504, spark timing (solid bar) may be retarded 40 degrees from MBT during the port injection.

Turning now to the example injection profiles of map 550, an example injection profile that may be used during an engine cold start is shown at 551. In particular, injection profile 551 depicts fuel injection to a cylinder during a first cylinder combustion event (event1). During the engine cold start, an amount of first fuel (herein gasoline) is delivered into the cylinder as a first port injection (hatched block) during a closed intake valve event (that is, during an exhaust stroke of a previous cylinder combustion event). A second amount of the second fuel (herein E85) is delivered to the cylinder as each of a first intake stroke direct injection and a second compression stroke direct injection (diagonally striped blocks). The injection amounts are adjusted such that the port injection amount, the first intake stroke injection amount, and the second compression stroke injection amount are within 15% of each other. In the depicted example, 25% of the total fuel injection to the cylinder includes the first fuel delivered as a port injection during a closed intake valve event (e.g., during an exhaust stroke), another 35% of the total fuel injection includes the second fuel delivered as an intake stroke direct injection, while a remaining 40% of the total fuel injection includes the second fuel delivered as a compression stroke direct injection.

In addition to splitting the amount of fuel injected as a single port injection and multiple direct injections, a spark ignition timing may be adjusted. For example, at 551, spark timing (solid bar) may be set to be 12 degrees before TDC during the port injection.

Injection profile 552 depicts fuel injection to a cylinder during a first cylinder combustion event (event1') at hot start. The hot start may include an engine restart from idle stop for example. Alternatively, the hot start may include an engine restart from shut down where the engine has not been shut down for sufficiently a long duration (and has therefore not cooled down to ambient temperatures). During the engine hot start, no first fuel is injected into the cylinder as a first port injection while only the second fuel is injected as a direct compression injection (striped block). The injection amounts may be adjusted such that the port injection amount, the first intake stroke injection amount, and the second compression stroke injection amount can be 0% to 100%. In comparison, 20% of the total fuel injection may be delivered as a port injection (of first fuel) during a start at normal ambient temperature, another 30% of the fuel injection may be delivered as an intake stroke direct injection, while a remaining 50% of the fuel injection is delivered as a compression stroke direct injection.

In addition to the single port injection during the engine hot start, spark ignition timing may be adjusted. For example, at 552, spark timing (solid bar) may be set at TDC compared to 12 degree before TDC for normal ambient temperatures.

Injection profile 553 depicts fuel injection to a cylinder during engine cranking, and after an engine start (hot start or cold start), specifically, for n number of cylinder combustion events since the first cylinder combustion event (events 2 through n). During the engine cranking, fuel injection is transitioned to a profile where a larger portion of first fuel is port injected into the cylinder during a hot restart while a smaller portion of the second fuel is direct injected as intake/compression stroke injection. The injection amounts may be adjusted such that the port injection amount and the direct injection amount are 0% to 100% of each other. In one example, 60% of the total fuel injection may be delivered as a port injection during the cranking while another 40% of the total fuel injection may be delivered as a compression stroke direct injection.

In addition to splitting the amount of fuel injected as a single port injection and a single direct injection, spark ignition timing may be adjusted. For example, at 553, spark timing (solid bar) may be adjusted to 12 degrees before TDC.

Injection profile 554 depicts fuel injection to a cylinder that may be used following engine start and cranking, and after an engine idle speed has been attained, specifically, for a number of cylinder combustion events since the completion of cranking (events n through m). During the engine idle control while the engine is warming up, fuel injection is transitioned to a profile where the amount of first fuel port injected into the cylinder is substantially similar to the amount of second fuel that is direct injected as an intake stroke injection. Further, no fuel is direct injected during the compression stroke. The injection amounts may be adjusted such that the port injection amount and the direct injection amount are within 0% to 100% of each other. In addition to splitting the amount of fuel injected as a single port injection and a single direct injection, spark ignition timing may be adjusted. For example, at 554, spark timing (solid bar) may be retarded 40 degrees from MBT during the port injection.

As can be seen by comparing the injection profiles of map 500 with the injection profiles of map 550, as a difference between the alcohol content of the first fuel and the second fuel increases port fuel injection percentages may be increased.

It will be appreciated that while the examples of FIGS. 3-5 depict fuel injection profiles for fuels of differing alcohol content, the same trends may be applicable for fuel injection profiles of fuels of differing volatility with a first ratio of port fuel injection of a first fuel to direct injection of a second fuel decreased as a relative volatility of the second fuel (relative to the first fuel) increases, and with a second ratio of intake stroke direct injected fuel to compression stroke direct injected fuel decreased as the alcohol content of the second fuel increases.

In this way, by adjusting an engine fuel injection amount between a direct injector and a port injector based on the nature of the fuels available, the fuels may be better leveraged. By also adjusting the injection based on a cylinder combustion event number and the catalyst temperature, the fuel efficiency and power output advantages of direct injection (of a higher alcohol content fuel) may be achieved in addition to the faster catalyst heating advantages of port injection (of a lower alcohol content fuel), all without degrading exhaust emissions. The combination of simultaneous using port and direct injection fuel systems adds robustness to engine start performance at both extreme cold and hot conditions. In addition, at nominal ambient temperatures, the combination of simultaneous use of port and direct injection fuel systems with multiple fuels of varying alcohol content enables emissions to be optimized, especially particulate emissions. As such, the use of turbocharging and direct injection for fuel efficient engines can increase particulate emissions. Thus, by simultaneously using port and direct injection fuel systems during engine start, catalyst warming, and engine warm-up can be achieved while enabling low PM emissions from engines and power trains, including turbocharged engine configurations.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising,
for a first combustion event since engine start, performing each of:
port injecting a first amount of a first fuel during a closed intake valve event; and
direct injecting a second amount of a second fuel over multiple injections of the first combustion event, the first fuel having a lower alcohol content than the second fuel.

2. The method of claim 1, wherein the first fuel is gasoline and the second fuel is a gasoline-ethanol blend.

3. The method of claim 2, wherein a first ratio of the first port injection amount to the second direct injection amount is based on an alcohol content of each of the first fuel and the second fuel.

4. The method of claim 3, wherein the first ratio is decreased as the alcohol content of the second fuel relative to the alcohol content of the first fuel increases.

5. The method of claim 3, wherein the first ratio is further based on one or more of a soot load of the engine, exhaust catalyst temperature, and engine temperature.

6. The method of claim 2, wherein injecting the second amount of the second fuel over multiple injections includes injecting the second amount as at least an intake stroke injection and a compression stroke injection.

7. The method of claim 6, wherein the first port injection amount, the intake stroke injection amount, and the compression stroke injection amount are within 0% to 100% of each other.

8. The method of claim 7, wherein a second ratio of the intake stroke injection amount relative to the compression stroke injection amount is adjusted based on the alcohol content of the second fuel and one or more of exhaust catalyst temperature, engine temperature, and a soot load of the engine, the second ratio decreased as the alcohol content of the second fuel increases.

9. The method of claim 8, wherein each of the first and second ratio is further based on a combustion event number since engine start.

10. The method of claim 8, further comprising, retarding spark timing based on the exhaust catalyst temperature and engine temperature at the engine start.

11. The method of claim 10, wherein the amount of spark retard is further based on one or more of the first and second ratios and the alcohol content of the second fuel.

12. The method of claim 1, further comprising continuing the port injecting of the first fuel and direct injecting of the second fuel over multiple fuel injections during cranking.

13. The method of claim 12, wherein the continuing is performed for a number of combustion events since the first combustion event, the number based on a cylinder event number and an alcohol content of the second fuel, the number increased as the alcohol content of the second fuel increases.

14. The method of claim 12, further comprising, after cranking, transitioning fuel injection to an engine idle profile dependent on catalyst temperature, engine start temperature and soot load with the first ratio for port injected fuel amount to direct injected fuel amount and a second ratio for direct injected intake stroke amount to direct injected compression stroke amount.

15. The method of claim 12, further comprising, after cranking, transitioning fuel injection to port injecting the first fuel during a closed intake valve event and direct injecting the second fuel during either the intake stroke or the compression stroke, the first ratio of port fuel injection amount to direct injection amount adjusted to be higher after cranking relative to before cranking.

16. A method for an engine, comprising:
for a first combustion event at an engine cold-start,
port injecting a first lower volatility fuel during a closed intake valve event while direct injecting a second higher volatility fuel as at least an intake stroke injection and a compression stroke injection, initial amounts of each injection selected based on a volatility of each of the first and second fuel.

17. The method of claim 16, further comprising continuing the port injection of the first fuel and direct injection of the second fuel for a number of combustion events since the first combustion event during engine cranking, the number of combustion events based on the volatility of the first fuel relative to the volatility of the second fuel, the number of combustion events increased as a difference between the volatility of the first fuel and the volatility of the second fuel increases.

18. The method of claim 17, wherein continuing the port injection and direct injection for a number of combustion events includes continuing the port injection and the direct injection during the engine cold-start and cranking until a threshold cylinder event number is reached, and then transitioning fuel injection to engine idle with a first ratio setting for port injected fuel amount to direct injection fuel amount and a second ratio setting for direct injected intake stroke amount to direct injected compression stroke amount.

19. The method of claim 17, wherein a port fuel injection amount and direct fuel injection amount is adjusted after the cranking on a cylinder event number basis from the first combustion event, the port fuel injection amount increased and the direct fuel injection amount correspondingly decreased.

20. The method of claim 18, wherein before the threshold cylinder event number is reached, a first ratio of the first port injection during the closed intake valve event relative to a sum of the direct injected intake and compression stroke injections is further based on estimated engine soot load, and wherein a second ratio of the intake direct injection relative to the compression direct injection is further based on the estimated engine soot load and the first ratio.

21. An engine system, comprising,
an engine;
a first port injector configured to deliver a first fuel to an engine cylinder;
a second direct injector configured to deliver a second fuel to the engine cylinder, the second fuel having a higher alcohol content than the first fuel; and
a control system with computer readable instructions for, for a first cylinder combustion event, and based on a cylinder combustion event number since the first event,
　　transitioning cylinder fuel injection from a first fuel injection profile to a second fuel injection profile, the first fuel injection profile including a first port injection of the first fuel during a closed intake valve event and a second direct injection of the second fuel during each of an intake stroke and a compression stroke, the second fuel injection profile including a first port injection of the first fuel during the closed intake valve event and one or more direct injections of the second fuel during the intake stroke and/or the compression stroke.

22. The system of claim 21, wherein the first injection profile and the second injection profile are based on the alcohol content of the second fuel relative to the alcohol content of the first fuel, and further based on catalyst temperature, engine temperature and soot load, and wherein a proportion of fuel direct injected into the cylinder is higher in the first injection profile as compared to the second injection profile.

\* \* \* \* \*